United States Patent
Bridges et al.

(10) Patent No.: US 7,457,774 B1
(45) Date of Patent: Nov. 25, 2008

(54) DYNAMIC REALLOCATION HEDGE ACCOUNTING

(75) Inventors: Tim Bridges, Summit, NJ (US); Mark Evans, New York, NY (US); Oliver Frankel, New York, NY (US)

(73) Assignee: Goldman Sachs & Co., New York, NY (US)

( * ) Notice: Subject to any disclaimer, the term of this patent is extended or adjusted under 35 U.S.C. 154(b) by 458 days.

(21) Appl. No.: 09/724,075

(22) Filed: Nov. 28, 2000

(51) Int. Cl.
*G06Q 40/00* (2006.01)

(52) U.S. Cl. ............................. 705/36; 705/37; 705/35

(58) Field of Classification Search ............... 705/37, 705/36, 38, 35, 34
See application file for complete search history.

(56) References Cited

U.S. PATENT DOCUMENTS

| | | | | |
|---|---|---|---|---|
| 5,704,045 | A | 12/1997 | King et al. | 395/235 |
| 5,905,974 | A * | 5/1999 | Fraser et al. | 705/37 |
| 6,101,484 | A | 8/2000 | Halbert et al. | |

(Continued)

FOREIGN PATENT DOCUMENTS

| | | |
|---|---|---|
| WO | WO 00/48111 A1 | 8/2000 |
| WO | WO 00/67139 A1 | 11/2000 |

OTHER PUBLICATIONS

Statement of financial accounting standards No. 133, accounting for derivative instruments and hedging activeities by Edmund L. Jenkins (Hereinafter Jenkins Nov. 1998, vol. 186, Iss. 5; 12.*

DevX Energy, Inc. Reports Record Earnings in 1st Quarter Business Editors. Business Wire. New York: Nov. 14, 2000. p. 1☐.*

"Supplementary European Search Report", dated Feb. 22, 2007 for EP 01 99 8881, 2pgs.

*Primary Examiner*—Frantzy Poinvil
*Assistant Examiner*—Clement Graham
(74) *Attorney, Agent, or Firm*—Buckley, Maschoff & Talwalkar LLC

(57) ABSTRACT

A hedged exposure and an associated hedging instrument can be accounted for to reduce periodic earnings volatility associated with the hedged exposure. The accounting to reduce the earnings volatility includes designating a portion of the value of the financial exposure as being hedged by the hedging instrument. The designated portion is determined based on a price sensitivity of the hedging instrument with respect to changes in market value of an underlying instrument. In each of a number of sequential periods, the portion of the financial exposure is redesignated based on changed price sensitivity of the hedging instrument. Periodic earnings volatility associated with a hedged exposure also can be reduced by dividing (for accounting purposes) the hedging instrument into a first part (also referred to as a designated part) and a second part (also referred to as a residue part). This division is made in a way that ensures that changes in the value of the first part substantially offset changes in value of the financial exposure. The method also includes designating a portion of the first part as a hedge of the financial exposure such that the remainder of the first part offsets the delta of the second part. In each of a plurality of sequential periods, the portion of the first part is redesignated to maintain the relationship between the first part and the second part whereby the remainder of the first part offsets the delta of the second part.

12 Claims, 1 Drawing Sheet

U.S. PATENT DOCUMENTS

| | | |
|---|---|---|
| 6,144,959 A | 11/2000 | Anderson et al. |
| 6,157,918 A | 12/2000 | Shepherd ..................... 705/37 |
| 6,321,212 B1 * | 11/2001 | Lange ......................... 705/37 |
| 6,343,272 B1 * | 1/2002 | Payne et al. .................... 705/4 |
| 6,360,210 B1 * | 3/2002 | Wallman ...................... 705/36 |
| 6,393,409 B2 * | 5/2002 | Young et al. .................. 705/37 |
| 6,513,019 B2 * | 1/2003 | Lewis .......................... 705/35 |
| 6,560,580 B1 * | 5/2003 | Fraser et al. .................. 705/37 |

* cited by examiner

DYNAMIC REALLOCATION HEDGE ACCOUNTING

This application is related to a U.S. patent application Ser. No. 09/723,694 entitled "Reduction of Financial Instrument Volatility" filed on Nov. 28, 2000.

BACKGROUND OF THE INVENTION

Financial Accounting Standards Board Statement No. 133 (FAS 133) ("Accounting for Derivative Instruments and Hedging Activities"), as amended by Financial Accounting Standards Board Statement No. 138 (FAS 138), establishes accounting and reporting standards for derivative instruments and for hedging activities. Briefly, FAS 133 requires that an entity recognize all derivatives as either assets or liabilities in the statement of financial position and measure those instruments at fair value. If certain conditions are met, a derivative may be specifically designated as (a) a hedge of the exposure to changes in the fair value of a recognized asset or liability or an unrecognized firm commitment, (b) a hedge of the exposure to variable cash flows of a recognized asset, liability or of a forecasted transaction, or (c) a hedge of the foreign currency exposure of a net investment in a foreign operation, an unrecognized firm commitment, an available-for-sale security, or a foreign-currency-denominated forecasted transaction.

The accounting for changes in the fair value of a derivative (that is, gains and losses) depends on the intended use of the derivative and the resulting designation.

For a derivative designated as hedging the exposure to changes in the fair value of a recognized asset or liability or a firm commitment (referred to as a fair value hedge), the gain or loss is recognized in earnings in the period of change together with the offsetting loss or gain on the hedged item attributable to the risk being hedged. The effect of that accounting is to reflect in earnings the extent to which the hedge is not effective in achieving offsetting changes in fair value.

For a derivative designated as hedging the exposure to variable cash flows of a forecasted transaction (referred to as a cash flow hedge), the effective portion of the derivative's gain or loss is initially reported as a component of other comprehensive income (OCI) (outside earnings) and subsequently reclassified into earnings when the forecasted transaction affects earnings. The ineffective portion of the gain or loss together with any excluded portion is reported in earnings immediately.

For a derivative designated as hedging the foreign currency exposure of a net investment in a foreign operation, the effective portion of the gain or loss is reported in other comprehensive income (outside earnings) as part of the cumulative translation adjustment. The accounting for a fair value hedge described above applies to a derivative designated as a hedge of the foreign currency exposure of an unrecognized firm commitment or an available-for-sale security. Similarly, the accounting for a cash flow hedge described above applies to a derivative designated as a hedge of the foreign currency exposure of a foreign-currency-denominated forecasted transaction.

For a derivative not designated as a hedging instrument, the gain or loss is recognized in earnings in the period of change.

One of the requirements for hedge accounting when using a derivative is that changes in the value of the derivative must be expected to be highly effective in offsetting changes in value (or projected cash flows) of the hedged item. When hedging with options, one issue that may arise under FAS 133 is whether changes in time value can be included in the assessment of hedge effectiveness. In a totally static hedge strategy in which the hedged items do not contain embedded options, changes in time value would generally not offset changes in fair value or projected cash flows. To allow purchased options to qualify for hedge accounting, FAS 133 permits exclusion of all or a part of the hedging instrument's time value from the assessment of hedge effectiveness. If time value is excluded from the assessment of the hedge effectiveness, then the change in the time value would have to be recognized in earnings as they occur. FAS 133 suggest two methods that can be used with respect to excluding time value changes: (i) time value being computed as the fair value of the option minus the intrinsic value; and (ii) time value being computed as the fair value of the option minus the minimum value.

FAS 133 requires derivatives to be highly effective if they are to qualify for hedge accounting. The decision of how hedge effectiveness will be measured affects the determination of whether an item is (likely to be) highly effective and potentially the amount deferred in other comprehensive income (OCI). To be eligible for hedge accounting, FAS 133 requires "Both at inception of the hedge and on an ongoing basis, the hedging relationship is expected to be highly effective in achieving offsetting changes in fair value (cash flow) attributable to the hedged risk during the period that the hedge is designated." (par. 20b/28b). The Statement notes (par. 389) "The Board intends "highly effective" to be essentially the same as the notion of "high correlation" in Statement 80."

In hedging with purchased options, ineffectiveness can arise due to the dynamic nature of market prices. For example, large moves in spot prices can introduce hedge ineffectiveness. This results from the fact that the option price is a convex function of the spot rate, whereas the value of the hedged item is linear in spot. In addition, because the option price is a function of volatility, whereas the value of the underlying instrument (such as a currency, a commodity, or an interest bearing instrument) is not, changes in market volatility can lead to hedge ineffectiveness. It is noted that the change in value of an option due to changes in volatility can be excluded from the test of effectiveness; however, if this were done, changes due to volatility would have to be reported in earnings. Furthermore, the value of an option may change with time, while the value of the hedged item (i.e., the underlying instrument) does not. It is noted that the change in the value of the option due to changes in time may be excluded from the test of effectiveness; however, if this is done, changes due to time decay would have to be reported in earnings.

Methods for determining whether a hedge is highly effective include (i) the cumulative offset method or (ii) by the rolling historical correlation method. Cumulative offset methodology measures effectiveness by dividing the cumulative change in value of the derivative with the cumulative change in either fair value or projected cash flows of the item being hedged. A hedge may be viewed as effective when the cumulative offset ratio calculated by comparing these two numbers is within a range of approximately 80% to 125%. Rolling historical correlation methodology can be used before hedge inception to determine whether the application of hedge accounting is reasonable given past results. This method may also be used to measure ongoing effectiveness once a hedge is put in place. For example, the company decides to measure effectiveness based on a rolling two year correlation. 3 months into a hedge, it will measure correlation based upon the trailing 2 years which will include the 3 months' hedge results plus the 21 months' prior to putting the hedge in place. An r-squared of approximately 0.8 (correlation coefficient of 0.894) is generally considered sufficient for a company to apply hedge accounting.

With respect to options, one hedging method in which changes in time value (or at least those unrelated to changes in volatility) are considered "effective" is a so-called delta-neutral hedge. FAS 133 specifically permits a type of delta-neutral hedging in which a company hedges a fixed cash position by adjusting the notional amount of the option it owns (FAS 133, paragraphs 85-87). More specifically, FAS 133 permits a company to monitor an option's 'delta'—the ratio of changes in the option's price to changes in the price of the underlying instrument. As the delta ratio changes, the company buys or sells put options so that the next change in the fair value of all other options held can be expected to counterbalance the next change in the value of the underlying. In general, for Call options hedging a strengthening underlying, the delta ratio moves closer to one (i.e., 100%) as the underlying strengthens and moves closer to zero as the underlying weakens. The delta ratio also changes as the time to expiry decreases, as interest rates change, and as implied volatility changes.

In some cases, delta neutral hedging of a fixed cash position achieved through adjustments to the notional amount of an option, as disclosed by FAS 133, is undesirable because it changes the economics of the strategy from, for example, a simple option purchase. Consequently, other "effective" hedging strategies compatible with a wide range of desired economic outcomes are desirable.

Terminology

Black-Scholes: A solution for valuing options developed by Fischer Black, Myron Scholes and Robert Merton in 1973 for which they shared the Nobel Prize in Economics.

Call Option: A call option is a financial contract giving the owner the right, but not the obligation to buy a pre-set amount of the underlying financial instrument at a pre-set price with a pre-set maturity date.

Collar: A combination of options in which the holder of the contract has bought one out-of-the money option call (or put) and sold one (or more) out-of-the-money puts (or calls). Doing this locks in the minimum and maximum rates that the collar owner will use to transact in the underlying at expiry.

Delta: The sensitivity of the change in the financial instrument's price to small changes in the price of the underlying market prices, rates or index. Delta specifies the change in the value of a derivative as a fraction of the change in forward value of the underlying (provided the change is small). Thus, if the delta of a Euro (EUR) put is −35%, a forward appreciation of the EUR by 0.01 will reduce the value of the put by (−35%)*(0.01)=0.0035 (holding other factors constant). Other variants are also commonly used, such as the sensitivity of the value or future value of the derivative to changes in the spot price of the underlying.

Delta for a European option can be computed from the well-known Black-Scholes formula. For a put option, the formula to compute Delta is Delta=−$N(-d_1)e^{-rT}$, while for a call option, the formula to compute Delta is Delta=$N(d_1)e^{-rT}$, where: N( ) is the standard cumulative normal distribution; r is the domestic risk-free continuously compounded interest rate; T is the time to option expiration (in years); ln is the natural (base e) logarithm; F is the forward price of the underlying (to the settlement date of the option); K is the strike price of the option; is the implied volatility of the underlying exchange rate; and $$d_1 = \frac{\ln\left(\frac{F}{K}\right) + (\sigma^2)\frac{T}{2}}{\sigma\sqrt{T}}.$$

Alternatively, Delta may be calculated numerically for any pricing method employed to value a derivative.

Forward Contract: An over-the-counter obligation to buy or sell a financial instrument or to make a payment at some point in the future, the details of which were settled privately between the two counterparties.

Gamma: (or convexity) is the degree of curvature in the financial contract's price curve with respect to its underlying price. It is the rate of change of the delta with respect to changes in the underlying price.

Knockout Call: An option the existence of which is conditional upon a pre-set trigger price trading before the option's designated maturity. The option is deemed to exist unless the trigger price is touched before maturity.

Mark-to-Market (MTM): The current market value of a financial instrument.

Option: The right (but not the obligation) to buy (or, conversely, sell) some underlying instrument at a pre-determined rate on a pre-determined expiration date in a pre-set amount.

Over-the-Counter: Any transaction that takes place between two counterparties and does not involve an exchange is said to be an over-the-counter transaction.

Put Option: A put option is a financial contract giving the owner the right, but not the obligation to sell a pre-set amount of the underlying at a pre-set price with a pre-set maturity date.

SUMMARY OF THE INVENTION

In general, in one aspect, the invention features a method of reducing periodic earnings volatility associated with a hedged exposure. The method includes accounting for a financial exposure and an associated hedging instrument by designating a portion of the value of the financial exposure as being hedged by the hedging instrument. The designated portion is determined based on a price sensitivity of the hedging instrument with respect to changes in market value of an underlying instrument. In each of a number of sequential periods, the portion of the financial exposure is redesignated based on changed price sensitivity of the hedging instrument.

In general, in another aspect, the invention features a method of reducing periodic earnings volatility associated with a hedged exposure. The method includes accounting for a financial exposure and an associated hedging instrument by dividing the hedging instrument into a first part (also referred to as a designated part) and a second part (also referred to as a residue part) such that changes in the value of the first part substantially offset changes in value of the financial exposure. The method also includes designating a portion of the first part as a hedge of the financial exposure such that the remainder of the first part offsets the delta of the second part. In each of a plurality of sequential periods, the portion of the first part is redesignated to maintain the relationship between the first part and the second part whereby the remainder of the first part offsets the delta of the second part.

Implementations may include one or more of the following features. The hedging instrument may be, e.g., a put option, a call option, or a derivative. Accounting may be in accordance with Financial Standards Accounting Board Statement Number 133. The financial exposure may be associated with changes in market price of the underlying financial instrument. The hedging instrument may be an option to exchange (i.e., buy or sell) a first amount of the underlying financial instrument at a first price on a maturity date. The underlying instrument may be, e.g., a currency, a commodity or an interest rate. In each periods, a change in the value of the designated exposure and in the value of the hedging instrument may be computed. Price sensitivity can be computed as a delta value.

In general, in another aspect, the invention features a method of accounting for a hedged exposure. The method includes (i) procuring a hedging instrument to hedge a total exposure value of a financial instrument and, (ii) at a beginning of each of a series of sequential time periods, a designated portion of the total exposure value is calculated based on a current sensitivity of a price of the hedging instrument and the value of the exposure, and the hedging instrument is accounted for as a hedge on the designated portion of the total exposure value, and (iii) subsequent to an end of each time period and changes in the market value of the hedging instrument and in the market value of the designated exposure are calculated, and the change in market value of the hedging instrument offsetting the change in market value of the designated exposure is accounting for as other than earnings.

The invention may be implemented, in whole or in part, using a computer system that includes a processor, a database, and a memory storing instructions to configure the processor to perform the processes described herein. The details of one or more embodiments of the invention are set forth in the accompanying drawings and the description below. Implementations may provide advantages such as a reduction in quarterly earnings volatility associated with hedge accounting. Other features, objects, and advantages of the invention will be apparent from the description and drawings, and from the claims.

DETAILED DESCRIPTION OF THE INVENTION

Figure 1:
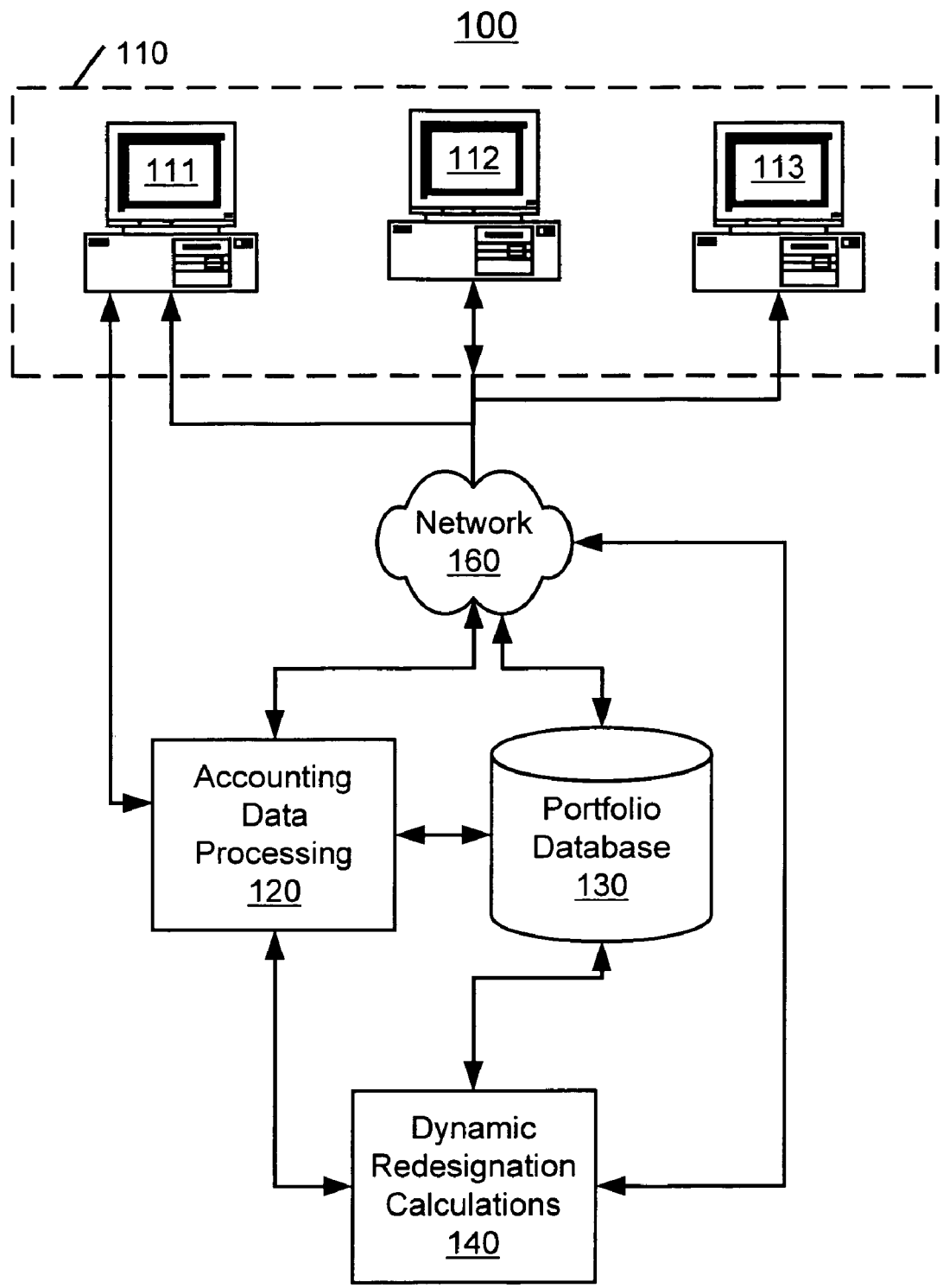
FIG. 1 is a computer network diagram.

To qualify as a fair value or cash flow hedge, FAS 133 requires, among other things, that hedging instruments must be effective (i.e. the basis risk to the underlying must be stable). Under FAS 133, some hedges that are meaningful (i.e., provide protection against volatility) in a long-term context (e.g., relative to a single quarter of earnings), but which do not qualify as either a cash flow hedge or a fair value hedge, must have their quarter-to-quarter change in mark-to-market value (MTM value) accounted for through a company's quarterly earnings. Other hedges may only qualify as either cash flow or fair value hedges by having certain components (such as time value) excluded from the assessment of hedge effectiveness and these components must be marked-to-market through earnings. Both of these circumstances may lead to an undesirable side effect of FAS 133 in which a hedge effected to reduce cash-flow or fair value volatility results in increased quarterly earnings volatility. In contrast, marked-to-market hedges that qualify under FAS 133 are entered in a company's balance sheet under Other Comprehensive Income (OCI), or in earnings with offsetting changes in the value of the hedged item, and do not have the same effects on quarterly earnings volatility.

Implementations of the invention can include a hedge accounting system that can reduce or remove undesirable quarterly earnings volatility side effects associated with certain hedging transactions. Use of this system can reduce the exposure to market prices of hedging instruments or components of hedging instruments whose change in mark (i.e., current market price) must, under FAS 133, be accounted for by adjustment to earnings. This accounting system, referred to as dynamic redesignation, is performed by appropriately designating and de-designating the portion of the underlying exposure being hedged by a derivative, option, or other hedging instrument as the delta of that hedging instrument changes. The amount of the underlying exposure designated as being hedged is determined based on the delta of the hedging instrument. This is done while keeping the notional of the hedging instrument steady. Both manual and computer-implemented systems may be used to perform the dynamic redesignation calculations, designations, and tracking.

Dynamic redesignation will be explained with respect to an option purchase to hedge an anticipated conversion of 100 Euros (EUR) into U.S. dollars (USD). Note, however, that the invention is not limited to EUR to USD conversion, but rather is applicable to other underlying (including, but not limited to, a financial instrument, a commodity or an interest rate), and to any other derivative not otherwise excluded from receiving hedge accounting, and the delta of which falls within the range of hedgable exposure. Furthermore, although this example is a cash flow hedge, the described processes are applicable to all types of hedging relationships including, but not limited to, cash flow, fair value, foreign exchange cash flow hedges as well as hedges of net investments in foreign operations. In this case, the underlying exposure being hedged is the risk associated with change in the conversion rate (i.e., changes in the spot exchange rate) of EUR to USD. The explanation of dynamic redesignation for this hedge transaction will refer to EUR to USD conversion rates for the period of Oct. 18, 1999 to Apr. 3, 2000, shown in Table 1. The "Market" section of table 1 give the spot exchange rates (in USD per EUR) (shown in the "Spot" column), 3-month US and European interest rates (shown in the "US IR" and "EUR IR" columns, respectively) and 3-month exchange rate volatility (shown in the "Vol." column). These "Market" data can be used to calculate the delta of the option (shown in the "Delta" column), the forward exchange rate to the expiration date (shown in the "Fwd." column), and the mark-to-market price of the option (shown in the "Option" column).

On or shortly before Oct. 18, 1999, Company Z expects to receive EUR 100 on Apr. 3, 2000. On Oct. 18, 1999, to guard against loss in the value of this expected EUR 100, Company Z hedges this risk exposure through the purchase of a EUR 100 put option for the conversion of the EUR 100 into USD on Apr. 3, 2000. As shown in Table 1, on Oct. 18, 1999, the cost of the put option is $3.081, the exchange rate for conversion of EUR to USD is 1.0864 USD/EUR, the volatility is 10.65%, the delta is −46.93%, and the forward price for the EUR to USD conversion is $1.1002. To minimize effects on quarterly earnings during the October 18-April 3 period, Company Z wants to ensure that the hedge is and remains "effective." That is, Company Z wants to ensure that any significant value changes are accounted for in OCI.

Although the EUR100 put is ultimately intended as a hedge of EUR100, in general, it will be "highly effective" as a hedge for small changes in the exchange rate only if designated as hedging the delta-equivalent portion of the exposure, i.e. EUR 46.93 in this example. As time passes the exchange rate, and correspondingly, the delta of the derivative will change. As a result the derivative will cease to be "highly effective" as a hedge of EUR 46.93. To help ensure "effective" hedge accounting, the dynamic reallocation accounting procedure is applied. In each of a series of sequential periods, Company Z will, (i) at the beginning of each period, designate a portion of the EUR 100 exposure to be accounted for as a hedged exposure (the "designated exposure"); and (ii) at the end of each period, determine any contributions to earnings and OCI by examining the change in value of the option over the period and compared that change to the change in value of the designated exposure over the same period.

In accordance with the dynamic reallocation procedure, at the end of each period in which the Euro weakens against the dollar, causing the delta of the option to increase, a growing fraction of the exposure is redesignated as being hedged. Conversely, at the end of each period in which the Euro strengthens against the dollar, causing the delta of the option to decline, a reduced fraction of the exposure is designated as being hedged. For each period, in accordance with the FAS 133 rules for cash flow hedge accounting, if the change in the value of the option is less in magnitude than the change in the value of the designated exposure, then all of the change in the value of the option is accumulated as OCI; as a results, there is no impact on earnings. On the other hand, if the change in the value of the option is greater in magnitude than the change in the value of the designated exposure, then the change in the value of the option offsetting the change in value of the designated exposure is recorded in OCI, and the excess change in the option is reported in earnings. In general, this procedure results in relatively small changes in earnings.

The data in Table 1 will now be applied to the example. On Oct. 18, 1999, a Put option is purchased to hedge a EUR 100 to USD conversion on Apr. 3, 2000. As shown in the "Option" column, the price paid for this option is $3.081. At this time, a portion of the EUR 100 exposure to be hedged by the option is determined (i.e., the designated exposure is determined). To determine the designated exposure, the current delta of the option (46.93%) is multiplied by the total exposure (EUR 100). This results in a designated exposure of 46.93 Euros for the two-week period ending Nov. 1, 1999, (this value is shown in the "Desig." column of Table 1).

On Nov. 1, 1999, the first designation period ends, and a new designation period of November 1-November 15 begins. The change in value of the designated exposure and the change in value of the option during the first designation period may then be compared, the effectiveness of the hedge during that period determined, and an allocation for that period made to earnings or OCI. On November 1, the value of the option is $5.153 resulting in a change in the value of the option of $5.153−$3.081=$2.072. The corresponding change in the value of the designated exposure is $−1.8364. This is calculated based on the change in forward price ("Fwd.") for the EUR to USD conversion for that period ($1.0611−$1.1002), multiplied by the designated amount (46.93). Comparing the change in value of the option to the change in value of the designated exposure results in a difference of $0.2355 to be recognized as earnings.

The designated exposure is then re-computed and reallocated for the second period (November 1-November 15) During the second period, the designated exposure is 67.11 Euros (Delta of 67.11% times the total exposure of EUR 100). At the end of the second period, the change in the value of the hedged portion is $−1.2880 (67.11 Euros times ($1.0419−$1.0611)), and the change in value of the option is $1.1683 (computed as $6.322−$5.153). For this second period, the magnitude of the change in the option value (1.1683) is less than the magnitude of the change in the designated exposure (1.2880). As a result, the entire difference ($−0.1197) is accumulated in OCI.

This bi-weekly determination of Earnings and OCI accumulations, as well as the re-computing and reallocation of the designated exposure, is repeated at the end of each two week period until Apr. 3, 2000. On Apr. 3, 2000, when the hedged item (i.e., the 100 Euros) is received and recognized in earnings, the changes in the value of the hedge accumulated in OCI is reclassified into earnings. In general, the net effect of this procedure will be to reduce earnings volatility during earnings quarters in the hedge period of November 1-April 3.

The expected hedge effectiveness of a dynamically redesignated hedge can be measured, e.g., by comparing (i) the gain/loss of the option position that would result from various decreases or increases in exchange rates, and (ii) the increase/decrease in the present value of the designated portion of the anticipated cash flow for the same exchange rate changes. The hedge may be considered ineffective to the extent that the actual realized and unrealized gains or losses from changes in the fair value of the options held is greater than the change in the projected cash flow. Generally, this would result in only a small amount of ineffectiveness to be recognized in earnings. Changes in the value of the option may not perfectly offset changes in the value of the designated exposure because, among other things, (i) changes in market volatility may affect the value of the option without affecting the value of the exposure; (ii) changes in interest rates can affect the values of the exposure and the option differently; (iii) for large changes in the exchange rate, the convexity of the option price becomes important and the value of the exposure is not convex in the exchange rate.

TABLE 1

| | Market | | | | Designation | | Prices | | Changes | | Accumulate in | |
|---|---|---|---|---|---|---|---|---|---|---|---|---|
| | Spot | US IR | EUR IR | Vol. | Delta | Desig. | Fwd. | Option | Exp. | Option | Earn. | OCl |
| 18 Oct. 1999 | 1.0864 | 6.20% | 3.43% | 10.65% | −46.93% | 46.93 | 1.1002 | 3.081 | | | | |
| 1 Nov. 1999 | 1.0493 | 6.16% | 3.50% | 10.45% | −67.11% | 67.11 | 1.0611 | 5.153 | −1.8364 | 2.0719 | 0.2355 | 1.8364 |
| 15 Nov. 1999 | 1.0315 | 6.07% | 3.45% | 9.70% | −78.88% | 78.88 | 1.0419 | 6.322 | −1.2880 | 1.1683 | 0.0000 | 1.1683 |
| 29 Nov. 1999 | 1.0102 | 6.11% | 3.45% | 11.00% | −85.43% | 85.43 | 1.0195 | 8.294 | −1.7642 | 1.9719 | 0.2076 | 1.7642 |
| 13 Dec. 1999 | 1.0122 | 6.12% | 3.46% | 11.55% | −85.57% | 85.57 | 1.0205 | 8.214 | 0.0846 | −0.0793 | 0.0000 | −0.0793 |
| 27 Dec. 1999 | 1.0136 | 6.18% | 3.45% | 11.09% | −88.17% | 88.17 | 1.0211 | 8.055 | 0.0494 | −0.1590 | −0.1096 | −0.0494 |
| 10 Jan. 2000 | 1.0252 | 6.03% | 3.32% | 11.10% | −86.74% | 86.74 | 1.0316 | 7.071 | 1.6547 | −1.7987 | −0.1440 | −1.6547 |
| 24 Jan. 2000 | 1.0021 | 6.04% | 3.32% | 10.75% | −95.59% | 95.59 | 1.0074 | 9.235 | −2.1045 | 2.1636 | 0.0590 | 2.1045 |
| 7 Feb. 2000 | 0.9784 | 6.10% | 3.50% | 11.90% | −98.25% | 98.25 | 0.9823 | 11.688 | −2.3920 | 2.4534 | 0.0614 | 2.3920 |
| 21 Feb. 2000 | 0.9867 | 6.11% | 3.61% | 11.75% | −98.87% | 98.87 | 0.9896 | 10.992 | 0.7093 | −0.6965 | 0.0000 | −0.6965 |

TABLE 1-continued

| | Market | | | | Designation | | Prices | | Changes | | Accumulate in | |
|---|---|---|---|---|---|---|---|---|---|---|---|---|
| | Spot | US IR | EUR IR | Vol. | Delta | Desig. | Fwd. | Option | Exp. | Option | Earn. | OCI |
| 6 Mar. 2000 | 0.9603 | 6.12% | 3.64% | 13.20% | −99.52% | 99.52 | 0.9621 | 13.741 | −2.7106 | 2.7495 | 0.0389 | 2.7106 |
| 20 Mar. 2000 | 0.971 | 6.23% | 3.77% | 12.30% | −99.76% | 99.76 | 0.9719 | 12.797 | 0.9734 | −0.9442 | 0.0000 | −0.9442 |
| 3 Apr. 2000 | 0.9558 | 6.29% | 3.83% | 12.45% | −100.00% | | 0.9558 | 14.440 | −1.6090 | 1.6435 | 0.0345 | 1.6090 |
| | | | | | | | | | | Totals = | 0.3834 | 10.1610 |

Exposure: EUR 100 expected on Apr. 3, 2000.
Hedged with PUT on EUR 100 on Oct. 18, 1999, struck at the forward.
Hedge relationship terminated and redesignated every 2 weeks Other approaches can be used to implement dynamic redesignation. One other approach is to separate the derivative into two parts: 1) an "effective" hedge part, and 2) a "residue" part. The "effective" part has the property that changes in the value of the effective part offset changes in the value of the hedged item. Preferably, these offsetting changes will be of substantially equal magnitude. The residue includes the remainder of the derivative. This separation is always possible, since the value of a derivative is determined by the cash flows it generates. In general, the residue does not receive hedge accounting and is marked to market through earnings. At inception of the hedge relationship, and on an ongoing basis, a portion of the effective part is designated as a hedge of a portion of the exposure, while the remainder of the effective part is not designated as a hedge of the exposure and, correspondingly, is marked to market through earnings. The amount of the effective part to be marked to market at any given time is selected to ensure that the total delta of the derivative being marked to market is zero (or very close to zero) at all times. As the value of the underlying changes and as time passes, the delta of the residue will change (as may the delta of the perfectly effective hedge), necessitating a change in the portion of the effective part designated as hedging a portion of the exposure.

This implementation requires that the delta of the entire hedge is 1) opposite in sign to the delta of the exposure, so that it is risk-reducing, and 2) smaller in magnitude than the maximum exposure eligible to be hedged. This dynamic redesignation implementation may be applied to derivatives otherwise ineligible for hedge accounting, including, but not limited to, basket options and net written options. It has the further advantage that demonstrating that the hedge is "highly effective" is usually more straightforward, in that the only derivative receiving hedge accounting is, by construction, perfectly effective.

This dynamic redesignation implementation is further explained with respect to a purchased put on EUR100. In this case, the purchase of the EUR100 put would be structured as the forward sale of EUR100, and the purchase of a call option on EUR100, at the same strike price as the put. Both the forward sale and the call option would settle on Apr. 5, 2000, the same date as the put settles and the underlying exposure is realized. The forward sale and the purchase of the call are together financially identical to the purchase of a put, a relationship known as put-call parity. The forward sale of EUR100 is a perfectly effective hedge of the exposure, and the purchased call on EUR 100 is the residue. The residue (the call) is not part of the hedge relationship, and is marked to market through earnings. Initially, the delta of the purchased call is about 47% (opposite in sign but similar in magnitude to the delta of the put when the strike and the forward exchange rate are equal), and the forward sale of about EUR50, enough to offset the delta of the call, will also be marked to market through earnings. The remaining forward sale of EUR50 is designated as hedging EUR50 of the exposure.

As time passes and the Euro weakens, the delta of the call will become smaller and smaller (it will be close to one minus the delta of the put in Table 1). Every two weeks (other time periods can also be used) the portion of the forward sale of Euros that is designated as a hedge is adjusted so that the delta of the undesignated forward sale offsets the delta of the call. In the example shown in Table 1, this means that, as time passes, more and more of the forward sale is designated as a hedge. The quantity of forwards (and the quantity of the exposure) designated as being part of a hedge relationship will be approximately one minus the exposure designated as being hedged in Table 1.

As a third approach, in both the alternative and original versions of dynamic redesignation, the process of redesignation may be replaced with a pair of closely offsetting trades, for example the sale and purchase of options with nearly identical strikes, or the forward purchase of Euros and the sale of Euros through a collar with little separated strikes.

FIG. 1 shows a computer network that may be used in computer-implemented dynamic reallocation system. In the network 100 both direct data connections between data storage and processing elements (e.g., between elements 120, 130 and 140) are show, as well as connections through a data network 160. In conventional fashion, direct connections may be replaced by connections through a network, and connections through a network by direct connections. Multiple elements in network 100 may be implemented in a single computer device. For example, a single computer system may include accounting and portfolio data processing system 120, software and disk storage to implement a database 130, and a system to perform dynamic redesignation calculations 140. Implementations also may use other computer system architecture variations. In some implementations, some or all of the functions performed by computer components in FIG. 1 may be implemented in a non-computerized fashion (e.g., manually by accountants).

In a computer-implementation of the dynamic reallocation process, an institutional client or an investment consultant may use a workstation or other computer terminal 111 to provision, access, and monitor portfolio data processed by accounting data processing functions of system 120. This portfolio data can include hedged exposures, their corresponding hedge instruments (i.e., derivatives and options), and data indicating whether the hedged exposures are being accounted for in accordance with the dynamic redesignation procedure. The data processing system 120 also may include software to perform corporate accounting functions and to implement accounting transactions pursuant to FAS 133 and other Financial Accounting Standards Board statements.

The system 120 may include an interface to a database system 130 storing the portfolio and account data for the institutional client. The portfolio database and accounting data processing system 120 may be a stand-alone system or a server accessible from a variety of terminals 112-113. Users at terminals 112-113 may interact with the server 120 using, e.g., a web browser or other terminal software or application program to access and modify portfolio and accounting data on behalf of their institutional clients. In some implementations, the clients may have direct access to the server 120 from their own terminals 111.

A software module 140 (which may be a component of the server 120 or of a separate analysis system) can access the portfolio database 130 to determine the sensitivity (delta) and other financial instrument modeling parameters associated with hedged exposures and their associated hedges (i.e., derivatives or options). Delta and other financial modeling parameters may be calculated by the module 140 using known calculation formulas and procedures (e.g., the Black-Scholes option pricing model).

The system 120 can query the database 130 to identify hedged exposures and their corresponding hedging instruments as well as to determine exposures to be accounted for using dynamic reallocation. Hedged exposures may be identified based on database fields designating them as such and/or by pointer data identifying a relationship between an exposure and a hedging instrument. Similarly, the use of dynamic reallocation accounting may be indicated by a database field indicating such. In some implementations, the system 120 may automatically analyze portfolios and hedges in the database 130 to determine portfolios for which dynamic reallocation is appropriate.

For hedged exposures for which dynamic reallocation is applied, the system 120 will periodically apply calculation functions 140 to determine the sensitivity (delta) of the exposure's associated hedge, and to periodically determine the portion of the exposure that, for accounting purposes, will be designated as being hedged. The designated portion can be tracked in the database 130. The designated exposure can be determined by functions 140 based on the sensitivity (delta) of the hedging instrument times the total exposure. In some implementations, the designated exposure calculation may be refined by considering the rate of change of the delta function or other predictors of movements in the delta function. In any case, the designated exposure and the sensitivity of the hedging instrument are correlated in that the designated exposure increases with increased price sensitivity of the hedging instrument to changes in price of the underlying exposure. This designated exposure may be determined on a bi-weekly basis. More frequent (e.g., daily) or less frequent (e.g., monthly) redesignation also may be used depending on the volatility of the hedging instrument. In general, increased volatility or convexity of the derivative will necessitate more frequent redesignation calculations.

At the end of each period, the system 120 compares the change in market value (i.e., the mark-to-market prices) of the hedging instrument and the designated exposure and, based on those changes in value, determines contributions to earnings and to OCI for that period. The process for determining contributions to earnings and to OCI is substantially the same as explained with reference to Table 1. Finally, when the total exposure is realized, the system 120 automatically transfers the amounts accounted for in OCI as earnings.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, the sensitivity calculation element 140 can calculate delta (sensitivity) and gamma (the rate of change of delta) using the well-known Black-Scholes methods, modifications of the Black-Scholes method, or other (non-Black-Scholes) calculations of sensitivity. Accordingly, other embodiments are within the scope of the following claims.

What is claimed is:

1. A hedge accounting method implemented by a programmed computer system for reducing periodic earnings volatility associated with a hedging transaction, the method comprising:

processing data and instructions on the computer to account for a financial exposure of an associated hedging instrument by designating, for accounting purposes, a portion of the value of the financial exposure as being hedged by the hedging instrument at a start of a first of a plurality of sequential periods, the designated portion being based on a delta of the hedging instrument representing a price sensitivity of the financial exposure with respect to changes in market value of the underlying instrument;

in each subsequent period of the plurality of sequential periods, processing data on the computer to compute a dynamic re-designation, for accounting purposes, of the portion of the financial exposure being hedged by the hedging instrument based on a change to the delta of the hedging instrument, to reduce periodic earnings volatility associated with a hedging transaction;

for each of the plurality of sequential periods, processing data and instructions on the computer system to compute a change in the value of the designated exposure in each one of the periods and a change in value of the hedging instrument during corresponding ones of the periods;

comparing the change in the value of the designated exposure in each one of the periods to the change in value of the hedging instrument during corresponding ones of the periods;

accounting for the change in value of the hedging instrument as other comprehensive income in the instance the change in value of the hedging instrument is less than the change in the value of the designated exposure in each one of the compared periods; and accounting for the change in value of the hedging instrument in excess of the change in value of the hedging instrument as earnings in the instance the change in value of the hedging instrument is greater than the change in the value of the designated exposure in each of the compared periods.

2. The method of claim 1 wherein the hedging instrument comprises an instrument selected from the group consisting of a put option, a call option, and a derivative.

3. The method of claim 1 wherein:
the financial exposure is associated with changes in market price of the underlying instrument; and
the hedging instrument is an option to exchange a first amount of the underlying instrument at a first price on a maturity date.

4. The method of claim 3 wherein the first amount is substantially equal to a total value of the financial exposure.

5. The method of claim 3 wherein the hedged item is an instrument selected from the group consisting of a currency, a commodity and an interest rate.

6. The method of claim 1 wherein:
the price sensitivity comprises a delta value;
the financial exposure is associated with an anticipated exchange of an amount of a foreign currency at a future date; and
the hedging instrument comprises an option for a future exchange of the amount of the foreign currency.

7. The method of claim 6 wherein the future exchange comprises an exchange selected from the group consisting of a put option and a call option.

8. A method implemented by a programmed computer system for reducing periodic earnings volatility associated with accounting for a hedging transaction, the method comprising:
executing a computer program module configured to receive data and process computer code instructions to account for a financial exposure of an associated hedging instrument, the hedging instrument comprising a first and a second part, said first part comprising a first sub-portion and a second sub-portion, wherein changes in the value of the first part offset, at least in part, changes in value of the financial exposure;
executing a computer program module configured to receive data and process computer code instructions to (i) determine a size of the first sub-portion relative to a size of the second sub-portion such that the second sub-portion offsets the delta of the second part and (ii) effect an accounting designation whereby the first sub-portion is designated as a hedge of at least a portion of the financial exposure at a start of a first of a plurality of sequential periods wherein the designation is based on a delta of the hedging instrument representing a price sensitivity of the financial exposure and the second sub portion is not designated as a hedge of the financial exposure; and
executing a computer program module configured to receive data and process computer code instructions to determine, in each subsequent period of the plurality of sequential periods, a dynamic re-designation, for accounting purposes, of the size of the first sub-portion designated as a hedge of at least a portion of the financial exposure relative to the size of the second sub-portion that is not designated as a hedge of the financial exposure such that the re-designation of the first sub-portion is based on the delta of the hedging instrument and the re-designated second sub-portion continues to substantially offset the delta of the second part, to reduce periodic earnings volatility associated with accounting for a hedging transaction.

9. The method of claim 8 wherein:
the first part comprises an effective part; and
the second part comprises a residue part.

10. A method of accounting for a hedged exposure, the method comprising:
procuring a hedging instrument to hedge a total exposure value of a financial instrument; and
on a computer system and prior to each of a series of sequential time periods, processing data and program instructions to cause the computer system to:
dynamically calculate a designated portion of the total exposure value based on a delta of a current sensitivity of a price of the hedging instrument and the value of the exposure, and
account for the hedging instrument as a hedge on the designated portion of the total exposure value; and
on the computer system and subsequent to an end of each period of the series of sequential time periods, processing data and program instructions to cause the computer system to:
determine a change in the market value of the hedging instrument over a corresponding time period,
determine a change in the market value of the designated exposure over the corresponding time period, and
account for said change in market value of the hedging instrument offsetting said change in market value of the designated exposure as other than earnings, to reduce periodic earnings volatility associated with accounting for a hedging transaction.

11. The method of claim 10 wherein the total exposure value of a financial instrument comprises an anticipated receipt of a value of a currency and the hedging instrument comprises an option for a sale of the value of the currency.

12. A computer system comprising:
a host computer comprising a processor coupled to a memory comprising instructions to configure the processor to process executable instructions and data to compute a value representing a reduction in earnings volatility in a derivative account, the instructions further comprising instructions to cause the processor to:
process said instructions to compute data to account for a financial exposure of an associated hedging instrument by designating a portion of the value of the financial exposure as being hedged by the hedging instrument at start of a plurality of sequential periods, the portion being determined based on:
processing of data representing a price sensitivity of the hedging instrument with respect to changes in market value of an underlying financial instrument; and
process said instructions such that, in each subsequent period of the plurality of sequential periods, data is computed to dynamically re-designate the portion of the financial exposure based on changed price sensitivity of the hedging instrument, to reduce periodic earnings volatility associated with accounting for a hedging transaction.

* * * * *